(No Model.)

J. CARR.
BICYCLE.

No. 528,145. Patented Oct. 30, 1894.

Witnesses.
A. Ruppert.
E. S. Trull.

Inventor:
John Carr,
by Franklin H. Hough
his Attorney

UNITED STATES PATENT OFFICE.

JOHN CARR, OF PHILADELPHIA, PENNSYLVANIA, ASSIGNOR OF ONE-HALF TO JOHN ERICKSON, OF GLOUCESTER, MASSACHUSETTS.

BICYCLE.

SPECIFICATION forming part of Letters Patent No. 528,145, dated October 30, 1894.

Application filed August 7, 1893. Serial No. 482,578. (No model.)

*To all whom it may concern:*

Be it known that I, JOHN CARR, a citizen of the United States, residing at Philadelphia, in the county of Philadelphia and State of Pennsylvania, have invented certain new and useful Improvements in Bicycles; and I do declare the following to be a full, clear, and exact description of the invention, such as will enable others skilled in the art to which it appertains to make and use the same, reference being had to the accompanying drawings, and to the letters of reference marked thereon, which form a part of this specification.

This invention relates to certain new and useful improvements in bicycles, and more particularly to the gearing thereof, of that class embodying the use of elliptical wheels, and it has for its object among others, to provide an improved construction for preventing lost motion and the loss of power.

I employ elliptical sprocket wheels. I am aware that an elliptical wheel has heretofore been used in a bicycle and I do not seek to cover such broadly in this application. I arrange my elliptical wheels, one on or near each end of the crank shaft, and these are set quartering. Then upon the axle of the rear wheel are arranged two more but smaller ones whose diameters are one half that of the larger ones and which are not only set quartering as regards each other but are set at right angles to those upon the crank shaft. By this means the greatest driving power is attained at a time when most force is applied to the cranks, and lost motion at such time is avoided.

Other objects and advantages of the invention will hereinafter appear and the novel features thereof will be specifically defined in the appended claims.

The invention is clearly illustrated in the accompanying drawings, which, with the letters of reference marked thereon, form a part of this specification, and in which—

Figure 1:
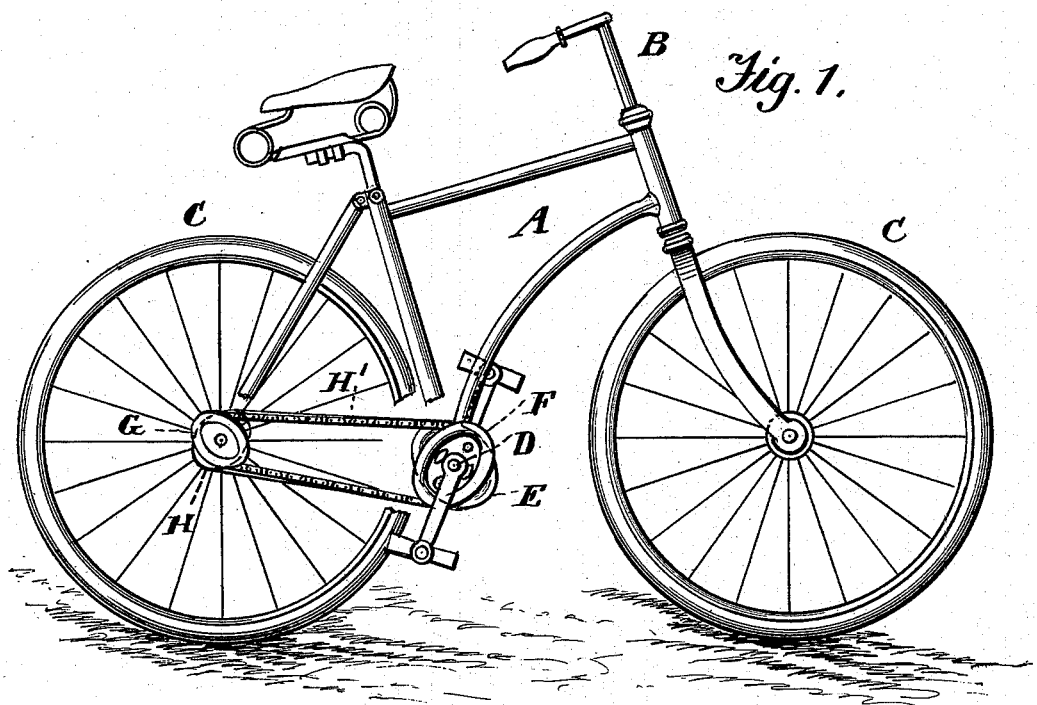
Figure 2:
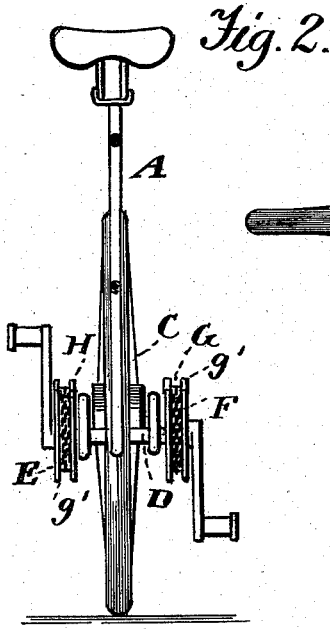
Figure 3:
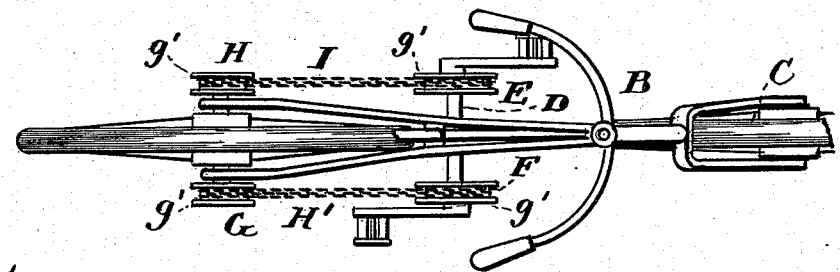
Figure 4:
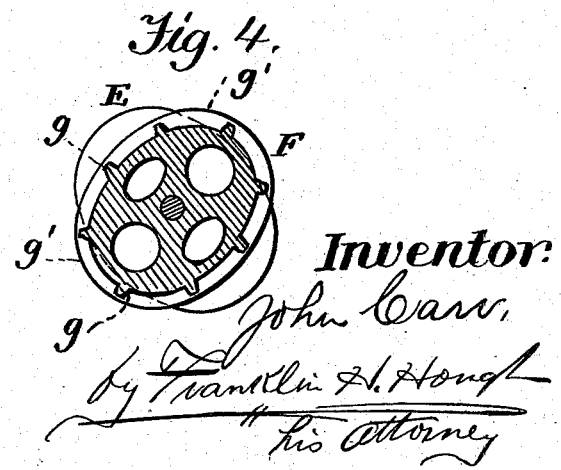

Figure 1 is a side elevation of a sufficient portion of a bicycle to show the application of my improvements. Fig. 2 is a vertical cross-section just in front of the pedals, looking to the rear. Fig. 3 is a plan view. Fig. 4 is a detail of one of the elliptical sprocket wheels detached.

Like letters of reference indicate like parts throughout the several views in which they appear.

Reference now being had to the details of the drawings by letter, A designates the frame, B the handle bars and C the wheels, all of known construction, and as they form no part of this invention no further mention thereof will be necessary.

D is the pedal shaft, of known construction, suitably supported in the frame of the machine, and designed to carry the pedals which may be of any approved form of construction. On this shaft there is secured near one end, an elliptical wheel F, while upon or near the other end there is secured a similar elliptical wheel E, these wheels being set quartering with relation to each other, that is, they are so arranged relatively to each other that a line drawn through the center of one in the direction of its greatest diameter will be at an angle of ninety degrees with relation to a line similarly drawn through the other.

On the rear axle there are secured two smaller elliptical wheels G and H, which are also set quartering to each other and also set quartering to the mate upon the pedal shaft, as shown. These wheels may be of any suitable form or construction, but preferably as shown in Fig. 4 wherein it will be seen that the teeth $g$ are arranged between a flange $g'$ on each face of the wheel, the teeth being upon a plane wholly within the said side flanges, as shown, so that the chain will be held between the said flanges and held against all possibility of displacement.

The chains H' and I are placed over the wheels upon opposite sides of the machine as shown, and by means of the novel arrangement of the elliptical wheels as the wheel on one side stands with its longer diameter in a given line the opposite one stands on a quarter ready to receive the power which is otherwise lost on the other side and slack in the upper side is prevented at the time when the pedal is at its highest point. The rear elliptical wheels take the slack from the forward ones in the same manner and the chain on one side is consequently kept taut upon the upper side when the pedal is at its highest point, while the one on the opposite side is slack, that pedal being down. Thus I obtain slack on each side of the wheel at points in the movement of the pedals when less force is available, and a taut chain on each side when greatest force is available, thereby obtaining greater speed at such times and avoiding practically all lost motion and slipping of the chains.

Having thus described my invention, what I claim to be new, and desire to secure by Letters Patent, is—

1. A bicycle driving gear embodying a plurality of elliptical wheels set quartering to each other in sets, one set comprising two wheels one half the size of the other and those of each set placed quartering with relation to each other, substantially as described.

2. The combination with the frame and the rear axle and pedal shaft, of elliptical wheels on the rear axle set quartering, and chains passing over the same and over elliptical wheels also set quartering on the pedal shaft and twice the size of the first mentioned wheels, whereby lost motion is prevented, as set forth.

3. The combination with the frame and the rear axle and the pedal shaft, of elliptical wheels on the pedal shaft, set quartering with relation to each other, elliptical wheels on the hind axle and one half the size of the others, set quartering to each other and to the wheels on the pedal shaft, and chains connecting the same, whereby a taut chain is provided when the pedal is at its highest point, substantially as described.

In testimony whereof I affix my signature in presence of two witnesses.

JOHN CARR.

Witnesses:
HARRY A. SCHIPPER,
CHAS. R. GINTNER.